United States Patent
Kim et al.

(10) Patent No.: US 8,619,218 B2
(45) Date of Patent: Dec. 31, 2013

(54) DISPLAY SUBSTRATE AND DISPLAY DEVICE INCLUDING THE SAME

(75) Inventors: Hyuk-Jin Kim, Asan-si (KR); Hyo-Taek Lim, Asan-si (KR); Kweon-Sam Hong, Seoul (KR); Hyun Park, Cheonan-si (KR); Tae-Hyeong Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 267 days.

(21) Appl. No.: 13/045,400

(22) Filed: Mar. 10, 2011

(65) Prior Publication Data

US 2012/0081640 A1    Apr. 5, 2012

(30) Foreign Application Priority Data

Oct. 4, 2010    (KR) .................. 10-2010-0096404

(51) Int. Cl.
*G02F 1/1335*    (2006.01)
(52) U.S. Cl.
USPC ............ 349/106; 349/155; 349/156; 349/157
(58) Field of Classification Search
None
See application file for complete search history.

(56) References Cited

U.S. PATENT DOCUMENTS

2011/0090445 A1*  4/2011  Kim et al. ............... 349/139

FOREIGN PATENT DOCUMENTS

| JP | 10-068969 A | 3/1998 |
|----|-------------|--------|
| JP | 2002049057 A | 2/2002 |
| JP | 2003-029269 A | 1/2003 |

* cited by examiner

*Primary Examiner* — Thanh-Nhan P Nguyen
(74) *Attorney, Agent, or Firm* — Innovation Counsel LLP

(57) ABSTRACT

A display substrate and a display device including the same are provided. The display substrate includes a first substrate which is divided into a display portion including pixel regions and a non-display portion including a region other than the display portion. Color filters are formed in the pixel regions of the substrate to respective thicknesses. At least one stepped pattern is formed on the non-display portion of the substrate and from the same material as used to form at least one of the color filters. The stepped patterns are formed at an area occupancy density of 20% or more of the non-display portion. A minimum distance is maintained between the stepped patterns and the pixel regions.

17 Claims, 5 Drawing Sheets

DISPLAY SUBSTRATE AND DISPLAY DEVICE INCLUDING THE SAME

CROSS-REFERENCE TO RELATED APPLICATION

This application claims priority from Korean Patent Application No. 10-2010-0096404 filed on Oct. 4, 2010 in the Korean Intellectual Property Office, and all the benefits accruing there from under 35 U.S.C. 119, the contents of which application in its entirety are herein incorporated by reference.

BACKGROUND

1. Field of Disclosure

The present disclosure of invention relates to a display substrate and a display device including the same. More specifically, it relates to a first display substrate that is to be spaced apart from a second display substrate by a distance that is uniform across a display area of the display (e.g., a Liquid Crystal Display or LCD).

2. Description of Related Technology

In the currently evolving information-oriented society, electronic display devices play important roles and various types of electronic display devices are widely used in various industrial fields. Further, there is a desire for various electronic devices to have a solid state structure, low voltage operation and low power consumption, as well as lightness in weight and compactness of structure (e.g., reduced thickness and weight) while at the same time having consistently good, high resolution display quality even at extreme ends of an image displaying area. The consistency of display quality at extreme ends of the image displaying area may be dependent in devices such as LCD's on consistency of cell gap distance as between first and second display substrates. However, it may be more difficult to maintain a same consistent cell gap distance at extreme ends of the image displaying area that corresponds to cell gap distance at the center of the display area.

It is to be understood that this background of the related technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a display substrate with improved display quality for use in a corresponding display device of relatively small weight and reduced thickness where the improved display quality occurs about a transition zone between where an image displaying area (DA) ends (its extreme ends) and a non-displaying area (peripheral area PA) begins.

According to an aspect of the present disclosure of invention, a first display substrate has a base substrate which is divided into an image displaying portion including operative pixel regions and a non-displaying portion. Color filters are formed in the pixel regions of the image displaying portion of the base substrate. One or more stepped patterns (e.g., island-shaped mesas) are formed on the non-displaying portion of the base substrate, wherein the one or more stepped patterns are formed with a same foundation material as the color filters and to substantially same heights as the color filters so as to thereby substantially reproduce at the ends of the display area, a substrate height profile that mimics one found at the center of the display area. In one embodiment, the stepped patterns are formed to have an area occupancy density of about 20% or more but less than 100% of the area of the non-displaying portion.

According to another aspect of the present disclosure, there is provided a display device including the above described first display substrate and further including a second display substrate spaced apart from and facing the first display substrate, and a liquid crystal material layer interposed between the first display substrate and the second display substrate.

According to still another aspect of the present disclosure, there is provided a display device including the first and second display substrates as described above where the second display substrate has different kinds of cell gap establishing spacers protruding therefrom including first spacers protruding over the color filters and second spacers protruding over the stepped pattern(s).

Other aspects of the present disclosure will become apparent from the below detailed description and drawings.

BRIEF DESCRIPTION OF THE DRAWINGS

The above and other aspects and features of the present disclosure will become more apparent by describing in detail exemplary embodiments in accordance with the disclosure by reference to the attached drawings, in which.

DETAILED DESCRIPTION

Figure 1:
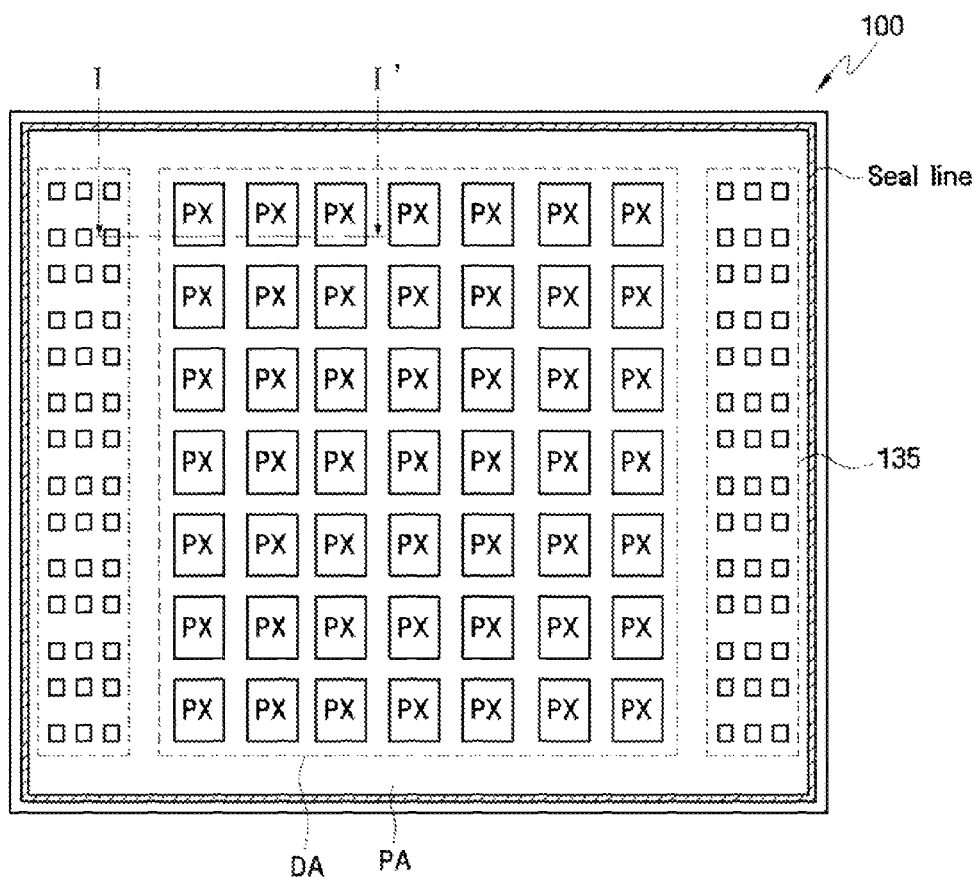
FIG. 1 is a conceptual diagram of a display substrate in accordance with an embodiment in accordance with the disclosure.

Advantages and features of embodiments made in accordance with the present disclosure and methods of accomplishing the same may be understood more readily by reference to the following detailed description and the accompanying drawings. The present teachings may, however, be embodied in many different forms and should not be construed as being limited to the embodiments set forth herein. Rather, these embodiments are provided so that this disclosure will be thorough and complete and will fully convey the concept of the present teachings to those skilled in the pertinent art. Throughout the specification, like reference numerals in the drawings generally denote like elements.

It will be understood that when an element or a layer is referred to as being "on" or "connected to" another element or layer, it can be directly on or directly connected to the other element, or intervening elements may also be present. In contrast, when an element is referred to as being "directly on" or "directly connected to" another element, there are no intervening elements present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Embodiments in accordance with the disclosure are described herein with reference to plan and cross-section illustrations that are schematic illustrations of idealized embodiments. As such, variations from the shapes of the illustrations as a result, for example, of manufacturing techniques and/or tolerances, are to be expected. Thus, the illustrated embodiments should not be construed as limiting the teachings to the particular shapes of regions illustrated herein; rather the teachings are to be seen as including deviations in shapes that result, for example, from manufacturing.

Unless otherwise defined, all terms (including technical and scientific terms) used herein have the same meaning as commonly understood by one of ordinary skill in the art to which this disclosure most closely pertains. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, a display substrate and a display device including the same in accordance with embodiments of the present disclosure will be described with reference to the accompanying drawings.

Figure 2:
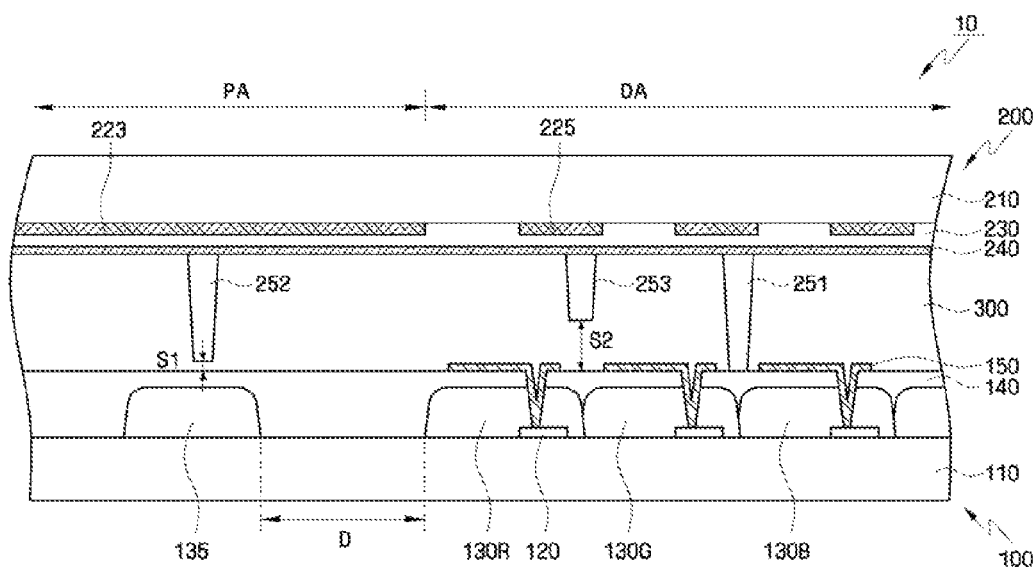
FIG. 2 is a cross sectional view of a display device including the display substrate of FIG. 1, which is taken along line I-I' of FIG. 1.

Referring first to FIG. 1, shown is a top plan view of a first display substrate 100 which is operatively usable in a display device 10 (e.g., LCD) including the first display substrate 100. FIG. 1 is a conceptual block diagram of such a first display substrate 100. FIG. 2 is a cross sectional view of the display device including the first display substrate 100 of FIG. 1, which is taken along line I-I' of FIG. 1.

Referring to FIGS. 1 and 2, the display device 10 may include a first display substrate or panel 100 having a base substrate 110 on which a plurality of differently colored color filters 130R (red), 130G (green) and 130B (blue) are formed. The display device 10 may further include a second display substrate or panel 200 that is spaced apart from and in operative facing relation with the first display substrate 100. A liquid crystal material layer (LC) is interposed between the first display substrate 100 and the second display substrate 200. Typically the liquid crystal material layer (LC) is enclosed within a sealing ring (Seal-Line) as a continuum of fluidic liquid crystals where the thickness and/or density of the liquid crystal material layer (LC) may vary from place to place although uniform thickness and density of liquid crystals is desired across all operative pixel regions (PX) of the device 10.

More specifically, the first display substrate 100 in accordance with the conceptually illustrated embodiment may include the first base substrate 110, the plurality of differently colored color filters 130R, 130G and 130B disposed on the base substrate 110 and at least one repeated step pattern 135 (e.g., an island-shaped mesa) also disposed on the base substrate 110 but in an area spaced apart from where operational ones of the color filters are provided within corresponding ones of operational pixel regions PX. As will become more apparent below, a purpose of the repeated step pattern 135 is to substantially mimic in the non-display area a height profile found on average for example near the center of the display area. As will also become more apparent below, the repeated step pattern 135 may engage with a mid-sized spacer (252) that substantially mimics in the non-display area an average spacer height profile such as one found on average for example near the center of the display area. As a result of these features, the effective cell gap distance found at the extreme ends of the display area (DA) can be substantially equal to the effective cell gap distance found at the center of the display area (DA) and thus image quality at the extreme ends of the display area may be kept substantially the same as image quality provided at the center of the display area.

The first base substrate 110 is divided into an operational image display area portion, DA that includes a plurality of pixel regions PX and into a non-display or peripheral area portion PA that includes structures other than the image creating ones of the display area portion DA.

In the illustrated case, the pixel regions PX are arranged in as a regular matrix having rows and columns. However, other arrangements of pixels or subpixels are contemplated. In one embodiment, each pixel region PX is a region where white light emitted from a light source (edge or back, not shown) of a backlight assembly (not shown) is selectively passed at selectable different luminance levels through the differently colored color filters (e.g., three primary colors) 130R, 130G and 130B to thus display an image to an external viewer (not shown). Although the non-display portion PA is shown as arranged only outside the display portion DA in the drawings, it is not limited thereto and by way of example, the display area DA may have black matrix covered sections that do not provide image defining light passed therethrough. The base substrate 110 may be formed of a planar light-passing material such as glass (e.g., soda lime glass or borosilicate glass) and/or a plastic. The pixel regions PX, according to one aspect of these display device features, may be considered as repeated raised regions provided on top of a planar top surface of the base substrate 110 where the heights of these raised regions is defined at least in part by the thicknesses of the differently colored color filters (e.g., three primary colors) 130R, 130G and 130B provided for example in a representative center portion of the display area (DA).

As shown in idealized block diagram form in FIG. 2, pixel switching elements, such as thin film transistors (TFTs) 120 whose details are not shown, may be arranged on the base substrate 110 with each pixel switching element 120 corresponding to a respective one of the pixel regions PX. The heights of these pixel switching elements contribute to defining the heights of their respective pixel regions PX. More specifically, and even though such is not illustrated in detail in the drawings, the heights of the pixel switching elements may be defined a thickness of a gate wiring that integrally provided for transmitting gate signals to the switching elements 120 and by a thickness of a data wiring that is further integrally provided for transmitting data signals to the switching elements 120 where the wirings may be formed at different and insulatively separated interconnect layers that are integrally disposed on the base substrate 110. For example, the gate wiring may include gate lines extending in a row direction and having integrally extending therefrom gate electrodes of adjacent ones of the pixel thin film transistors (TFTs). For example, the data wiring may include data lines extending in a column direction, where source electrodes of the TFTs are integrally branched from adjacent ones of the data lines to extend into the TFT structures for disposition above the gate electrodes. Drain electrodes of the TFTs are separated from the corresponding source electrodes and are also formed above the gate electrodes so as to define transistor channel regions of the pixel thin film transistors. The pixel thin film transistors 120 may thus be defined by the gate electrodes, the source electrodes and the drain electrodes.

A specific structure of the pixel thin film transistors 120, although not shown, may be understood by those skilled in the art to include, in one embodiment, a gate insulating film of a small thickness formed on the gate electrode layer of a greater thickness and a semiconductor layer of yet another thickness formed on the gate insulating film and above the corresponding gate electrode.

The color filters 130R, 130G and 130B are formed with respective thicknesses (not necessarily identical) on the pixel regions PX of the base substrate 110. In other words, the color filters 130R, 130G and 130B may be formed to correspond to the pixel regions PX, respectively. In this case, the color filters 130R, 130G and 130B may be formed to cover the pixel thin film transistors 120 arranged in the respective pixel regions PX. Also not shown are various protective layers of respective thicknesses that may be interposed between the materials of the color filters and the TFTs for protecting the TFTs from chemical contamination or other degradation by the color filters or materials that may leach through the color filters.

The differently colored color filters 130R, 130G and 130B may respectively and predominantly transmit only lights of specific wavelength bands such that the respective pixel regions PX appear as specific colors to a human viewer. That is, each of the color filters 130R, 130G and 130B may include, e.g., a red pigment for transmitting lights of a red (R) band of wavelengths, a green pigment for transmitting lights of a green (G) band of wavelengths, and a blue pigment for transmitting lights of a blue (B) band of wavelengths. In other words, the color filters 130R, 130G and 130B may include red (R), green (G) and blue (B) color filters.

Further, the color filters 130R, 130G and 130B may be formed of a cured photosensitive organic material, e.g., hardened photoresist (PR) where thickness of the cured organic material (e.g., hardened PR) may vary as a function of fabrication process parameters such as the batch from which the PR material is obtained and temperature and/or other environmental ambients that the PR is subjected to before and/or during curing. For example, the photoresist material included in the color filters 130R, 130G and 130B may be a negative photoresist in which a portion exposed to light is cured (hardened and retained) or a positive photoresist in which a portion not exposed to light is cured (hardened and retained).

At least one repeating pattern of so-called step structures (stepped pattern) 135 is formed in the non-display portion PA of and on the base substrate 110 to complement and substantially mimic the heights of the color filters 130 that are found for example at a representative center portion of the display area (DA). The repeated at least one stepped pattern 135 is preferably formed at an area occupancy density of 20% or more in the non-display portion PA. In this case, the occupancy density of the stepped pattern 135 means a ratio equal to the areas of the mesas in the stepped pattern 135 divided by the valley area of the non-display portion PA that has the stepped pattern 135 included therein.

In one embodiment, the stepped pattern 135 is formed of the same base materials (e.g., PR) as any one or more of that used for the color filters 130R, 130G and 130B so that the height profile of the stepped pattern 135 substantially mimics the height profile of the color filters 130R-130B irrespective of variations in fabrication process. A minimum spacing apart distance D is preferably provided as between the repeated stepped pattern 135 and the color filters 130R, 130G and 130B where in one class of embodiments, that minimum spacing apart distance D is 1.5 mm or more. In this case, the minimum distance D between the stepped pattern 135 and the color filters 130R, 130G and 130B may mean the smallest distance among distances between the closest one of the mesas in the stepped pattern 135 as formed on the non-display portion PA of the substrate 110 and the closest counterpart one of the color filters 130R, 130G and 130B formed on the display portion DA of the substrate 110. Accordingly, as shown in the drawings, the minimum distance D may be determined between the stepped pattern 135 arranged in a region of the non-display portion PA adjacent to the display portion DA and the color filters 130R, 130G and 130B arranged in an outer region of the display portion DA which is a boundary region between the display portion DA and the non-display portion PA.

It has been found that if the minimum distance D between the stepped pattern 135 and the color filters 130R, 130G and 130B is reduced to 0.88 mm or less, a desired consistency of effective liquid crystal cell gap may dramatically change in adjacent portions of the display area ends due to idiosyncrasies of the too close by stepped pattern 135, thereby continuously causing a whitish or other coloring phenomenon to occur around extreme edges of the display area DA due to the nearness of the repeated stepped pattern 135. On the other hand, if no repeated stepped pattern 135 is provided or one that is too far away, consistency of the effective liquid crystal cell gap as between the extreme edges of the display area (DA) and its center may suffer. Accordingly, as described above, it is preferable to separate the color filters 130R, 130G and 130B from the stepped pattern 135 by a distance of about 1.5 mm or slightly more but not so far away that the height profile mimicking aspects of the stepped pattern 135 are lost.

The stepped pattern 135 is formed of a same base material or same dyed materials (e.g., pigment colored PR material) as used in any one or more of the color filters 130R, 130G and 130B. For example, the stepped pattern 135 may be formed of the same material as the red color filters 130R. In this case, the stepped pattern 135 may be formed at the same time and from the same batch of curable material that the red color filters 130R are formed from (e.g., deposited and patterned). For example, in case of using a photolithography process, the stepped pattern 135 and the red color filters 130R may be developed through use of a same photolithography masking step. Alternatively, in case of using an inkjet process, the stepped pattern 135 and the red color filters 130R may be formed at the same step of depositing red color filter material with aid of an inkjet depositing device. By using a substantially same material (e.g., the PR of the color filters) and a same or substantially same deposition and/or patterning process for defining the heights of the mesas of the stepped pattern 135 as well as for defining the heights of the color filters 130, it is assured that the height above the base substrate 110 in the peripheral area (PA) where the stepped pattern 135 is formed will be essentially the same as the height above the base substrate 110 in the display area (DA) where operational pixels (PX) are provided irrespective of process variations; and by so doing, a combined effect with certain spacer gaps (S1, S2—described shortly) can be well controlled so that thickness and/or density of liquid crystals about a transition zone between the display area (DA) and the peripheral area (PA) can also be well controlled.

In some other embodiments, one or more of the stepped patterns 135 may be formed of the same material as the green color filters 130G. Similarly to the above, such stepped patterns 135 may be formed at the same time with formation of the green color filters 130G and under same fabrication process conditions. For example, the stepped pattern 135 and the green color filters 130G may be formed at the same time through a photolithography process of the same step or an inkjet process of the same step. Alternatively or additionally, one or more of the stepped patterns 135 may be formed of the same material as the blue color filters 130B and under same fabrication conditions. In brief, the stepped pattern 135 may be a negative or positive photoresist and may be formed of the same material as any one or more of the red (R), green (G) and blue (B) color filters so that the height profile of the stepped pattern 135 substantially mimics in the non-display area (PA) the height profile of the pixel regions (PX) near the center of the display area (DA).

The stepped pattern 135 is preferably separated from the color filters 130R, 130G and 130B by the minimum distance D of about 1.5 mm. When the stepped pattern 135 is separated from the color filters 130R, 130G and 130B by about 1.5 mm or more (but not too far), there is an advantage of preventing the above mentioned and undesirable whitish phenomenon, which may occur when a cell gap dramatically changes due to the somewhat arrangement of the stepped pattern 135 as opposed to the pixel regions. Specifically, if the stepped pattern 135 is formed on the non-display portion PA of the substrate 110 but too close to the display area DA, a liquid crystals containing cell gap at the extreme ends of the display area and as between the first substrate 110 and the second substrate 210 may increase rapidly due to the nearby stepped pattern 135, thereby causing an undesired gathering of liquid crystals thereat (e.g., an increase in liquid crystal density and hence a nonuniformity of liquid crystal density thereabout). In order to prevent the whitish phenomenon due to the gathering of liquid crystals in a widened portion of the cell gap that is too close to the display area, a distance between the stepped pattern 135 and the color filters 130R, 130G and 130B is set to be about 1.5 mm or more. Accordingly, it is possible to improve quality of an image displayed by the display portion DA at its extreme ends without having the undesirable gathering of liquid crystals thereat.

The stepped pattern 135 may be a repeat pattern formed with closely spaced mesas (in island-like shapes) on the non-display portion PA. As shown in FIG. 1, in one embodiment, the stepped pattern 135 having the island-like shape structure arranged as symmetrical parts on opposed sides of the non-display portion PA. Such a symmetrical distribution may be advantageous to the uniform spreading of liquid crystals of the liquid crystal layer interposed between the first display substrate 100 and the second display substrate 200. That is, it is possible to quickly and uniformly spread the liquid crystals injected between the first display substrate 100 and the second display substrate 200 by forming the stepped pattern 135 in an island-like shape instead of in the shape of a larger solid mesa structure. While not wishing to be bound to any theory, it is possible that the fluid dynamics of the liquid crystals causes them to flow by and around spacers (e.g., 251) disposed within the display area (DA) and to also flow about other structures disposed within the peripheral area (PA) whereby sporadic nonuniformities of liquid crystal density occur and/or rapid changes of effective liquid crystal thickness occur in the transition zone between the interior of the display area (DA) and the interior of the peripheral area (PA) whereby undesired image artifacts may appear in or about that transition zone. In accordance with one aspect of the present disclosure, so-called dummy spacers 252 are provided over the stepped pattern 135 so as to better control uniformity of the liquid crystal layer (LC) about the DA-to-PA transition zone and so as to substantially mimic a spaced apart function provided by non-dummy spacers 251 and 253.

In one embodiment, a passivation film 140 of predetermined thickness is formed to overlap the color filters 130R, 130G and 130B and provide planarization. Further, the passivation film 140 may be formed over the entire surface of the base substrate 110 on which the color filters 130R, 130G and 130B and the stepped pattern 135 are pre-formed. For example, the passivation film 140 may be formed of one or more of an inorganic material such as a silicon nitride, a silicon oxide or the like, an organic material having excellent planarization characteristics and photosensitivity, or a low-k insulating material formed by plasma enhanced chemical vapor deposition (PECVD), such as a-Si:C:O and a-Si:O:F. Further, the passivation film 140 may have a multi-layer structure whose layers contain respective ones of the above-mentioned materials.

Pixel electrodes 150 of predetermined thickness may be formed on the color filters 130R, 130G and 130B in the pixel regions PX. The pixel electrodes 150 may be electrically connected to the pixel thin film transistors 120 through contact holes 71, 72, 73 and 74. Specifically, the pixel electrodes 150 may be electrically connected to drain electrode extension portions which extend from the drain electrodes of the pixel thin film transistors and are formed in a relatively large area to improve electrical contact with the pixel electrodes 150. For example, the pixel electrodes 150 may be formed of a transparent conductor such as indium tin oxide (ITO) or indium zinc oxide (IZO) or a reflective conductor such as aluminum.

The second display substrate 200 may include a second base substrate 210, black matrix patterns 223 and 225, a planarizing overcoat layer 230, a common electrode 240, column spacers 251, 252 and 253 and the like.

While not explicitly shown, the layer LC of fluidic liquid crystal material is understood to be contained between the first and second display substrates, 100-200, and further contained by a surrounding sealing ring (seal line) where thickness of the fluidic liquid crystal material is determined by various spacing features provided between the first and second display substrates, 100-200.

The second base substrate 210 may be formed substantially similarly to the first base substrate 110 of the first display substrate 100. Specifically, the second base substrate 210 may include regions corresponding to the display portion DA and the non-display portion PA of the first substrate 110, respectively. In some other embodiments, the second base substrate 210 and the first substrate 110 may have different areas, but at least the display portion DA of the first substrate 110 and the second substrate 210 may be defined equally. Accordingly, in this case, the area of the non-display portion PA may be different in the first substrate 110 and the second substrate 210. Further, the second base substrate 210 may be formed of substantially the same material as the first base substrate 110 of the first display substrate 100.

The black matrix pattern 223 may be formed on the second substrate 210 to correspond to the non-display portion PA of the first display substrate 100. The black matrix pattern 223 includes a material serving as a light blocking film and it may be formed to correspond at least to the non-display portion PA in order to prevent leakage therefrom of light provided from the backlight assembly. As shown in the drawings, if the non-display portion PA is defined along the outline of the display portion DA, the black matrix pattern 223 may be formed in a region in which the non-display portion PA is defined along the outline of the display portion DA.

As shown in FIG. 2, an additional black matrix pattern 225 may be formed outside of the image projecting areas of the color filters 130R, 130G and 130B in the display portion DA. The black matrix pattern 225 of the display portion DA may serve to prevent uncontrolled light from leaking from regions other than those controlled by the pixel regions PX. Further, the black matrix pattern 225 may be formed above the pixel thin film transistors 120. The black matrix pattern 225 may be formed of an opaque material such as chromium (Cr), and may serve to improve image quality of the display device by preventing leakage of light.

The overcoat layer 230 may be formed on the black matrix patterns 223 and 225. For instance, the overcoat layer 230 may even out the height difference caused by the black matrix patterns 223 and 225.

The common electrode 240 may be formed on the overcoat layer 230. The common electrode 240 may be formed over the entire surface of the second base substrate 210 regardless of the pixels. For example, the common electrode 240 may be formed of a transparent conductive material such as indium tin oxide (ITO) and indium zinc oxide (IZO), but it is not limited thereto. Further, although not shown in the drawings, an alignment layer may be formed on the common electrode 240 and/or on the pixel-electrodes 150 and rubbed so as to provide a desired initial alignment orientation for the liquid crystal molecules when no electric field is present.

The liquid crystal (LC) layer 300 may be interposed between the first display substrate 100 and the second display substrate 200. Light transmittance through the liquid crystal layer 300 can be adjusted by a voltage difference established between the pixel electrode 82 and the common electrode 250 and a light polarization effect then provided by reoriented molecules of the liquid crystal layer 300.

The column spacers 251, 252 and 253 may include different kinds of spacers, including a first column spacer 251 disposed on the second base substrate 210 for example at a regularly reappearing spatial frequency (e.g., so many of such "main" spacers 251 per linear length of measure) and corresponding to the display portion DA. The different kinds of spacers may further include a second column spacer 252 also disposed on the second base substrate 210 and corresponding to structures (e.g., 135) in the non-display portion PA.

As shown in drawings, the first column spacers 251 may be arranged corresponding to the display portion DA. Specifically, the first column spacers 251 may be arranged in at least a portion of the pixel regions PX. In other words, the first column spacers 251 may be arranged to be present in some fractional subset of the pixel regions or in all the of the pixel regions PX. In other words, in some embodiments, the first column spacers 251 may be arranged to be present in each of the pixel regions PX.

The second column spacers 252 may be arranged corresponding to the non-display portion PA. The second column spacers 252 may each be of a predetermined length that provides a predetermined first height difference S1 relative to predetermined lengths of the first column spacers 251. More specifically, the first column spacers 251 may be each formed to be more protruded downwardly towards the first substrate 100 than the downward protrusion of the second column spacers 252 toward the first substrate 100 to thus define the first height difference S1 as between the first and second column spacers 251-252. For example, in one class of embodiments, the first height difference S1 may be about 0.4 μm to about 0.5 μm. In this case, the fact that the first column spacer 251 and the second column spacer 252 have the first height difference S1 may mean that an end of the first column spacer 251 toward the first display substrate 100 and an end of the second column spacer 252 toward the first display substrate 100 have a predetermined height difference. In one embodiment, users may be allowed to press down on a flexible top of the display device for purpose of providing touch sensitive interaction. The second spacing S2 may allow for such flexing and pressing down. Spacing S1 may define a weighted average of no the spacing provided by first spacers 251 and the S2 spacings provided by the third column spacers 253.

Further, as shown in FIG. 2, the second column spacers 252 may be arranged to each respectively overlap with a corresponding mesa of the stepped pattern 135. Accordingly, the second column spacer 252 may be formed on the second base substrate 210 to overlap with the black matrix pattern 223 of the second substrate 210 corresponding to the non-display portion PA of the first substrate 110.

In brief, the column spacers 251, 252 and 253 may include the first column spacer 251 arranged on the second display substrate 200 corresponding to the display portion DA of the first substrate 110, and the second column spacer 252 arranged on the second display substrate 200 corresponding to the non-display portion PA of the first substrate 110. The first column spacer 251 may be formed to be more protruded than the second column spacer 252 toward the first display substrate 100. For example, the first column spacer 251 and the second column spacer 252 may have the first height difference S1 of about 0.4 μm to about 0.5 μm.

As shown in FIG. 2, the different kinds of column spacers may further include the third column spacer 253 arranged corresponding to the display portion DA of the first substrate 110. The third column spacers 253 may be formed as regularly protruding downward from the second base substrate 210 and as being overlapped with the black matrix pattern 225 formed in the display portion DA of the first base substrate 110. Specifically, the first column spacer 251 may be formed to be more protruded than the third column spacer 253 toward the first substrate 110, and the second column spacer 252 may be formed to be more protruded than the third column spacer 253 toward the first display substrate 100 but less so protruded than the first column spacer 251.

In this case, the first column spacer 251 may have a second height difference S2 with the third column spacer 253. Further, the second height difference S2 may be larger than the first height difference S1, i.e., the height difference between the first column spacer 251 and the second column spacer 252. As described above, the fact that the first column spacer 251 and the third column spacer 253 have the second height difference S2 may mean that an end of the first column spacer 251 toward the first display substrate 100 and an end of the third column spacer 253 toward the first display substrate 100 have a predetermined height difference.

In some embodiments, the first column spacer 251 formed to have its terminal end as being the nearest end to the first display substrate 100 may be referred to as a "main spacer", the second column spacer 252 formed corresponding to the non-display portion PA may be referred to as a "dummy spacer", and the third column spacer 253 formed corresponding to the display portion DA and formed to have its terminal end as being more separated from the first display substrate 100 than is the terminal end of the first column spacer 251 may be referred to as a "subsidiary spacer." First and third spacers 251 and 253 may be referred to as non-dummy spacers.

As shown in the drawings, in the display substrate and the display device having the same in accordance with the embodiments of the present disclosure, the non-display portion PA of the first substrate 110 defined in an outer region of the display portion DA includes at least one stepped pattern 135, and the stepped pattern 135 is arranged such that the minimum distance D between the stepped pattern 135 and the color filters 130R, 130G and 130B of the display portion DA is about 1.5 mm or more. Accordingly, although the black matrix pattern 223 for blocking the light provided from below the first display substrate 100 is not provided beyond the non-display portion PA of the first display substrate 100, it is possible to reduce image quality reduction such as a whitish or reddish phenomenon which may occur in the transition zone or boundary between the display portion DA and the non-display portion PA.

Further, the terminal end of the second column spacer 252 in a region corresponding to the non-display portion PA is positioned more separately from the first display substrate 100 than is the terminal end of the first column spacer 251 in a region corresponding to the display portion DA, thereby reducing image quality reduction such as a whitish phenomenon due to a dramatic change in the effective cell gap dimension. Namely, it is possible to further improve display quality especially at the fringe areas of the display area DA.

Figure 3:
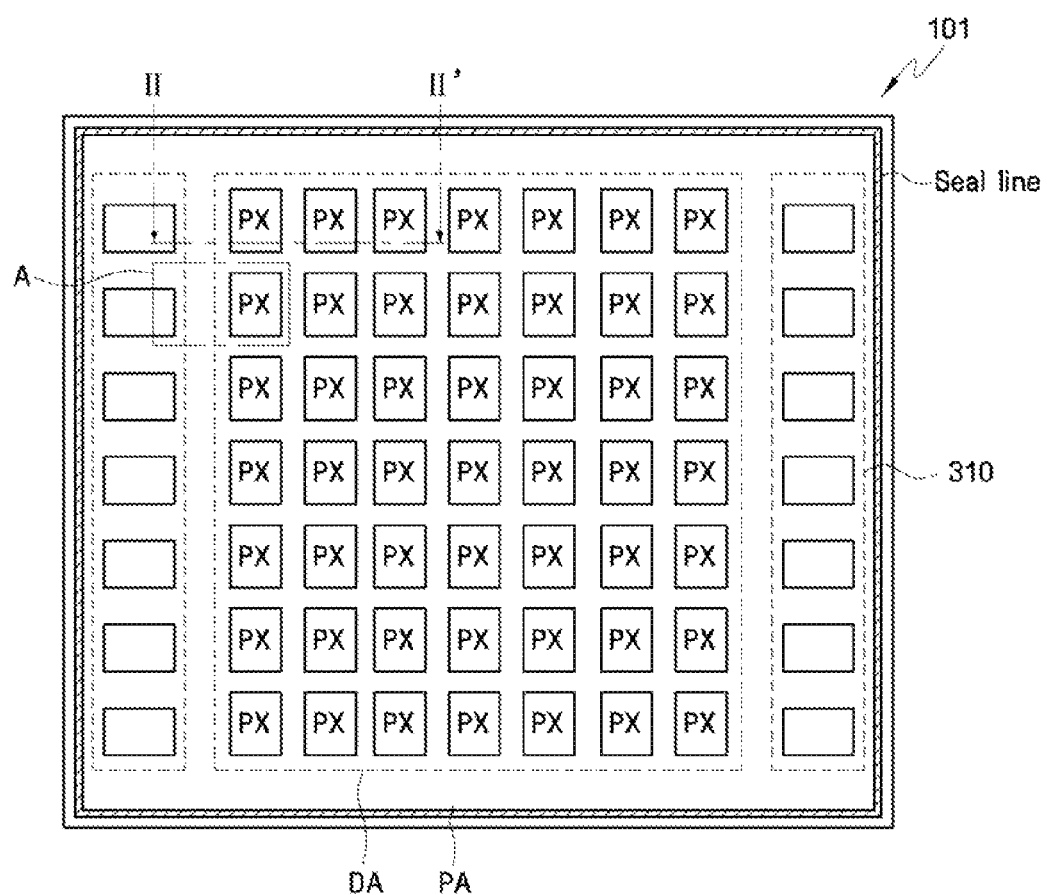
FIG. 3 is a conceptual diagram of a display substrate in accordance with another embodiment.
Figure 4:
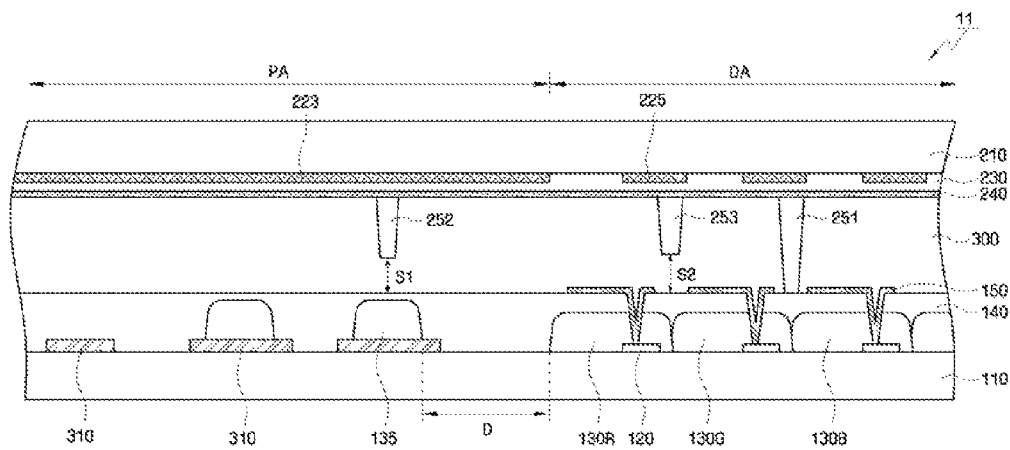
FIG. 4 is a cross sectional view of a display device including the display substrate of FIG. 3, which is taken along line II-II' of FIG. 3.
Figure 5:
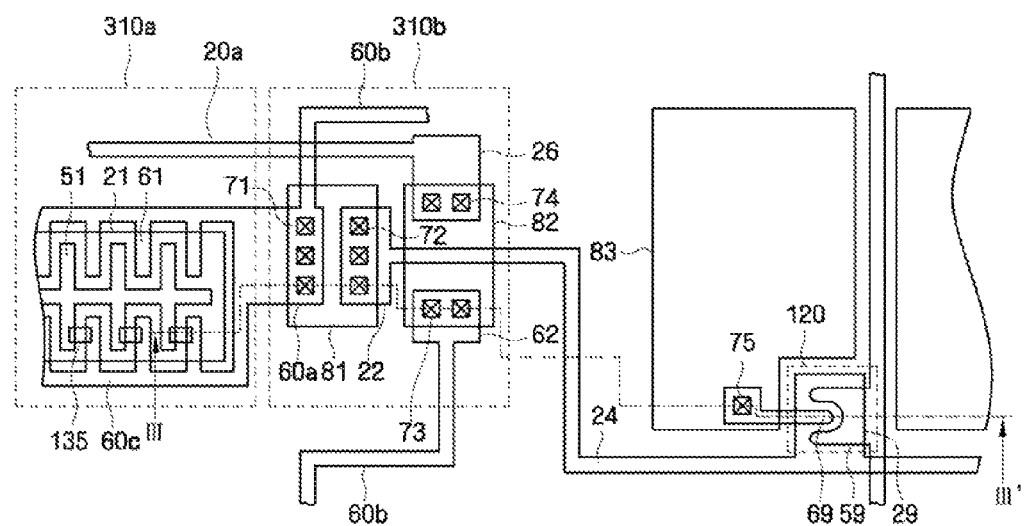
FIG. 5 shows a partial layout of the display substrate when a circuit unit of FIG. 4 has an amorphous silicon gate (ASG) structure.
Figure 6:
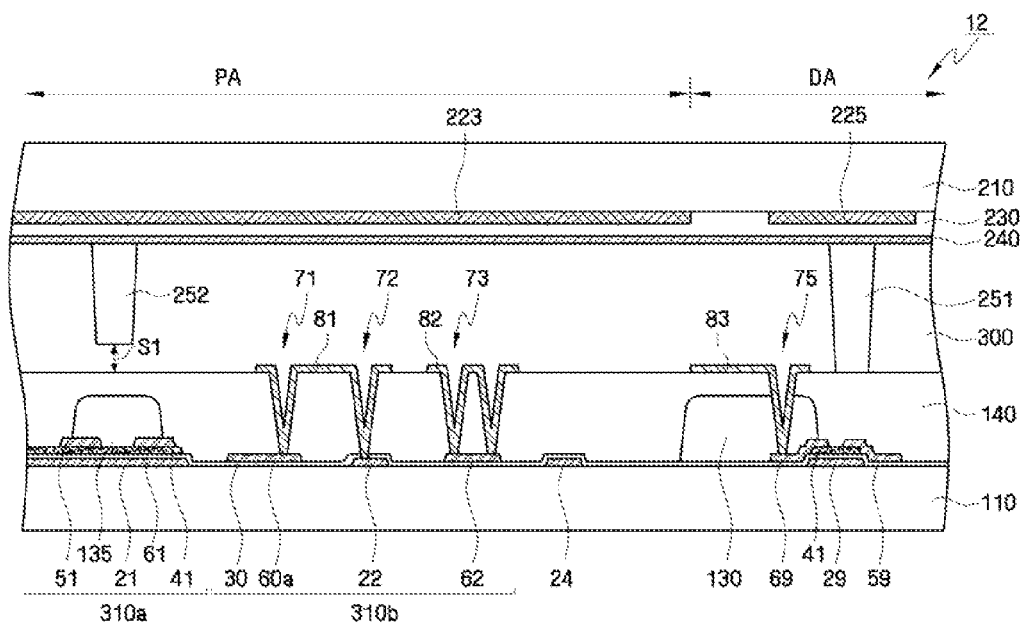
FIG. 6 is a cross sectional view of a display device, which is taken along line III-III' of FIG. 5.

A display substrate 101 and a display device 11 including the same in accordance with another embodiment will be described with reference to FIGS. 3 to 6. FIG. 3 is a conceptual diagram of the display substrate 101 in accordance with the other embodiments. FIG. 4 is a cross sectional view of the display device including the display substrate of FIG. 3, which is taken along line II-II' of FIG. 3. FIG. 5 shows a partial layout of the display substrate when a circuit unit of FIG. 4 has an amorphous silicon gate (ASG) structure. FIG. 6 is a cross sectional view of a display device 11, which is taken along line III-III' of FIG. 5. A difference as between FIG. 3 and FIG. 1 is that the repeated mesas 310 of FIG. 3 may each have operational circuitry monolithically integrated on them and the mesas may each be of greater area than the circuitless mesas 135 of FIG. 1.

The display substrate 101 and the display device 11 including the display substrate 101 in accordance with the other embodiment is more specifically different from those of the above-described first embodiment in that a circuit unit 310 (e.g., gate lines driver unit) is monolithically integrated within the non-display portion PA of the first base substrate 110 and distributed so as to define the height profiles of the mesas in the non-display portion (PA). The following description will be given focusing on the differences, and for convenience of explanation, the description of substantially the same components as the above-described components will be simplified or omitted.

Referring to FIGS. 3 and 4, the circuit unit 310 may be formed on the non-display portion PA of the first base substrate 110. In this case, the circuit unit 310 may mean one including certain semiconductive or conductive devices. For example, the circuit unit 310 may be a device included in a gate-lines driving unit or data-lines driving unit, and/or conductive wiring for coupling between circuitry outside the first and/or second substrates and circuitry of one or both of the first and second substrates. As shown in the drawings, the circuit unit 310 may include a plurality of units monolithically integrated on the non-display portion PA of the first base substrate 110 and the stepped pattern 135 may be arranged on top of the circuit unit 310 so that the final height of the top mesa area above stepped pattern 135 is defined by the thickness of the integrally incorporated circuitry 310 and the thickness of the color filter material forming the stepped pattern 135 and optionally an overlying sublayer of the planarizing passivation film 140. In this case, the fact that the stepped pattern 135 is arranged on the circuit unit 310 may mean that the stepped pattern 135 is formed on a pattern or material layer forming the circuit unit 310. Further, as shown in the later drawings, the circuit unit 310 may include a plurality of complex patterns, and the stepped pattern 135 may be arranged on some but not all of the patterns of the circuit unit 310.

Further, the first to third column spacers 251, 252 and 253 may be formed on the second substrate 210. The second column spacer 252 may be formed corresponding to any one of a plurality of the stepped patterns 135. The first height difference S1 between the first column spacer 251 and the second column spacer 252 and the second height difference S2 between the first column spacer 251 and the third column spacer 253 have substantially the same differences as described above.

FIGS. 5 and 6 show a case where the circuit unit 310 of the display's first substrate 101 has an active components section 310a and a wiring and contacts section 310b. The corresponding display device 11 includes the first and second substrates in similar accordance with the other, earlier described embodiments. The circuit unit 310 may be for example a monolithically integrated, gate-lines driving circuit that is structured for example like a multi-stage shift register whose stages output respective gate line drive signals for transmitting as gate control signals to the pixel regions PX of respective rows. In one embodiment, the circuit unit 310 is an amorphous silicon gate-lines drive (ASG) circuit.

Referring to FIG. 5, the gate-line direct driving circuit portion of the circuit unit 310 may include a source electrode contact unit 60a that is contiguous with a source region of an enlarged gate line driving transistor (partially shown). The direct driving circuit portion may also include a gate line contact unit 22, a first source or drain line 60b, a first contact pad 62, a second contact pad 26, the corresponding driven gate line 24 (partially shown), a first bridge line 81, and a second bridge line 82. The first and second bridge lines, 81 and 82 may have various functions including that of serving as test contact points that are to be contacted while the device is tested mid-stream during manufacture (e.g., before the liquid crystal material is sealed between the substrates).

The source electrode contact unit 60a may be connected to a second source or drain line 60c of a gate signal transmission transistor T1 of the gate driving circuit. In this case, the source electrode contact unit 60a and the second source or drain line 60c may be integrally formed with each other by extending the second source or drain line 60c to the display portion DA. Meanwhile, a first source or drain line 60b is connected with the source electrode contact unit 60a to transmit a gate-line output signal provided from a first source electrode 61 of the gate-line direct drive transistor T1 to a previous stage of the shift register.

The source electrode contact unit 60a and the gate line contact unit 22 are connected with each other, so that a gate-line output signal provided from the first source electrode 61 can be transmitted via the gate line 24 to a corresponding gate electrode 29 formed in each pixel of a driven row of the display unit. The source electrode contact unit 60a is formed above a gate insulating film 30, and the gate line contact unit 22 is formed below the gate insulating film 30, but they can be electrically connected with each other by means of the first bridge line 81 where the first bridge line 81 is formed of a same light-passing conductive material (e.g., ITO or IZO) as are the pixel-electrodes 83 and the first bridge line 81 is formed simultaneously by the same process that defines the pixel-electrodes. That is, although a passivation film 140 is formed on the source electrode contact unit 60a and the gate insulating film 30, a first contact hole 71 is formed in the passivation film 140 and the gate insulating film 30, so that the source electrode contact unit 60a and the gate line contact unit 22 can be connected with each other via the first bridge line 81. In this case, the first bridge line 81 may be formed on the planarizing passivation film 140 at the same time that the pixel-electrodes 83 are formed.

Meanwhile, the driven gate line 24 is connected to the gate line contact unit 22 such that a gate output signal transmitted from the source electrode contact unit 60a via the first bridge line 81 can be transmitted via the driven gate line 24 to the corresponding gate electrode 29 formed in each pixel of the driven gate line 24.

As shown in the drawings, the first contact pad 62 may be connected with the first source or drain line 60b of the next shift register stage, so that a gate output signal of the next stage can be applied to the first contact pad 62. Meanwhile, the first contact pad 62 may be located at one side of the driven gate line 24, and the second contact pad 26 may be located at the other side of the driven gate line 24. The second contact pad 26 may be connected with the first contact pad 62, so that a gate line driving output signal of the next stage can be applied to the second contact pad 26. Further, the second contact pad 26 may be connected with a second gate electrode 63 of a second transistor T2, so that a gate output signal of the next stage can be applied to the second gate electrode 63. In this case, the first contact pad 62 and the second contact pad 26 may be electrically connected with each other via the second bridge line 82. As is the case with the first bridge line 81, the second bridge line 82 is formed at the same time and of same materials as are the pixel-electrodes 83.

The first contact pad 62 may be formed above the gate insulating film 30, and the second contact pad 26 may be formed below the gate insulating film 30. That is, the second contact pad 26 may be formed in the same interconnect layer as the gate electrode. Meanwhile, the passivation film 70 may be formed on the first pad 62, and the gate insulating film 30 and the passivation film 70 may be formed on the second contact pad 26. Accordingly, in order to connect the first contact pad 62 with the second contact pad 26 via the second bridge line 82, a third contact hole 73 may be formed to expose the first pad 62, and a fourth contact hole 74 may be formed to expose the second contact pad 26. The first contact pad 62 and the second contact pad 26 may be connected with each other via the second bridge line 82 through the third and fourth contact holes 73 and 74. In this case the second bridge line 82 may be formed on the passivation film 70.

As illustrated in FIG. 5, the gate line driving circuit 310 having portions 310a and 310b may include a contacts-containing region 81 and a wiring region. The stepped pattern 135 may be formed above the wiring/contacts region of circuit portion 310b but patterned such that the stepped pattern 135 does not overlap and disturb formation of the contact holes 71, 72, 73 and 74 and bridges 81, 82 formed in the contact region 310b.

In this case, the contact region 310b may mean a region where the contact holes 71, 72, 73 and 74 are densely formed to electrically connect the lines formed in the gate lines driving circuit. Although contacts for electrical connection between wiring layers may be alternatively formed in the wiring region 310a, the contacts are typically relatively densely formed in the contact region 310b compared to the density of contacts in the active device and wiring region 310a. For example, if the circuit unit 310 is a gate-lines driving circuit including an amorphous silicon gate (ASG) circuit, a gate signal may be transmitted from the next stage or a gate signal may be transmitted to the previous stage via the first and second bridge lines 81 and 82 through the contact holes 71, 72, 73 and 74 of the contact region 310b.

As described above, the stepped pattern 135 may be formed over the active circuit region 310a such that the stepped pattern 135 does not overlap with and disturb formation of the contact holes 71, 72, 73 and 74 and bridges 81, 82 formed in the contacts region 310b. In another aspect, the stepped pattern 135 may be arranged in a relatively flat region such as over the drive transistor of region 310a. If the stepped pattern 135 is arranged in a relatively flat region such as the region 310a, it is possible to more stably form the stepped pattern 135 and relatively reduce a dramatic change in cell gap that might otherwise occur if the stepped pattern 135 were arranged in the relatively less flat contacts portion 310b, thereby improving image quality.

As shown in FIG. 6, the contact holes 71, 72, 73 and 74 formed in the contacts region 310b are formed to pass through the passivation film 140, or the passivation film 140 and the gate insulating film 30. Accordingly, if the stepped pattern 135 were to be arranged on the contact region 310b, the contact holes 71, 72, 73 and 74 would be formed to pass through the stepped pattern 135 in a subsequent etching process, where the additional etching process would be undesirable. However, if necessary, the stepped pattern 135 may be formed on the region 310a. That is, there is no exclusion of the embodiment in which the stepped pattern 135 is arranged over the less flat contacts region 310b; although formation over the flatter active/wiring region 310a is preferred.

Although only the first column spacer 251 and the second column spacer 252 are illustrated in FIG. 6, the third column spacer 253 (see FIG. 4) formed to be more separated from the first display substrate 100 than the second column spacer 252 may be arranged in the display portion DA. The explanation of the height difference between the first column spacer 251 and the second column spacer 252 is substantially the same as described above and, thus, a detailed description thereof will be omitted.

Although a case where the circuit unit 310 being a gate-lines driving circuit including an amorphous silicon gate (ASG) circuit has been described as an example in the drawings, various other circuit devices may be arranged in the circuit unit 310. For example, the stepped pattern may be formed on a wiring fanout unit for connecting signal lines formed in the display portion DA, e.g., data lines or gate lines, with a signal driving unit (e.g., an integrated circuit) formed in the non-display portion PA.

In the display substrate and the display device 11 including the same in accordance with the other embodiments of in accordance with the present disclosure, the stepped pattern 135 is formed on the circuit unit 310 formed in the non-display portion PA such that the stepped pattern 135 does not overlap with the contact holes 71, 72, 73 and 74. Accordingly, there is an advantage of minimizing a change to the existing layout. Further, it is possible to improve image quality of the display substrate and the display device including the same by maintaining the minimum distance between the stepped pattern and the color filter pattern to be equal to or larger than about 1.5 mm, and adjusting a distance between the first display substrate and the second column spacer arranged in a region corresponding to the non-display portion PA.

While the present disclosure of invention has been particularly shown and described with reference to exemplary embodiments thereof, it will be understood by those of ordinary skill in the art and in light of the foregoing that various changes in form and detail may be made therein without departing from the spirit and scope of the present disclosure. The exemplary embodiments should be considered in a descriptive sense only and not for purposes of limitation.

What is claimed is:

1. A display comprising:
a first substrate which has an image displaying portion including operative pixel regions and an image non-displaying portion;
color filters disposed on the pixel regions of the first substrate; and
one or more stepped patterns disposed on the first substrate but in the non-displaying portion of the first substrate,
wherein substantially all the stepped patterns are spaced apart from nearest ones of the color filters by a minimum spacing apart distance of about 1.5 mm or more.

2. The display of claim 1, wherein the color filters each includes a foundation material to which a respectively colored dye or pigment may be added and have respective heights at which they project above the base substrate, the stepped patters are formed with the same foundation material as at least one of the color filters.

3. The display of claim 1, wherein the color filters include red (R), green (G) and blue (B) color filters, and
the one or more stepped patterns include those formed of the same material as the red color filters.

4. The display of claim 1, wherein the stepped patterns are formed in island-like shapes on the non-display portion.

5. The display of claim 1, further comprising a circuit unit integrally formed on the non-display portion of the substrate,
wherein the circuit unit includes spaced apart contacts that are interconnectable for thereby electrically connecting lines formed in different layers of the circuit unit, and
the stepped pattern does not overlap with the contacts.

6. The display of claim 5, wherein the circuit unit includes a gate-lines driving circuit for transmitting gate control signals to the pixel regions, and the gate-lines driving circuit is an amorphous silicon gate driving circuit.

7. The display of claim 1, further comprising transistors formed in the pixel regions of the substrate.

8. The display of claim 1, wherein the stepped patterns are formed with a same material as that of at least one of the color filters.

9. The display of claim 1, wherein the stepped patterns are formed to substantially same heights as that of at least one of the color filters.

10. The display of claim 1, wherein the one or more stepped patterns are formed to have an area occupancy density of about 20% or more but less than 100% of the area of the non-displaying portion.

11. A display device comprising:
a first display substrate including a first base substrate which is divided into a display portion including pixel regions and a non-display portion including a region other than the display portion, color filters disposed in the pixel regions of the first base substrate, and at least one stepped pattern disposed on the non-display portion of the first base substrate;
a second display substrate spaced apart from and facing the first display substrate; and
a liquid crystal material layer interposed between the first display substrate and the second display substrate,
wherein the stepped pattern is formed of the same material as at least one of the color filters,
wherein the stepped pattern is formed at a density to occupy 20% or more of the non-display portion, and
wherein a minimum distance between substantially all the stepped patterns and the color filters is about 1.5 mm or more.

12. The display device of claim 11, wherein the color filters include red (R), green (G) and blue (B) color filters, and
at least some of the stepped patterns are formed of the same material as the red color filters.

13. The display device of claim 11, wherein the stepped pattern is formed in an island-like shape on the non-display portion.

14. The display device of claim 11, further comprising a circuit unit integrally formed on the non-display portion of the first display substrate,
wherein the circuit unit includes contacts for electrically connecting lines formed in different layers of the circuit unit, and
the stepped pattern does not overlap with the contacts.

15. The display device of claim 11, further comprising transistors formed in the pixel regions of the first substrate.

16. The display device of claim 11, wherein the stepped pattern is formed of a same material as that of at least one of the color filters.

17. The display device of claim 11, wherein the stepped pattern is formed at a density to occupy 20% or more of the non-displaying portion.

* * * * *